(12) United States Patent
Benedetti et al.

(10) Patent No.: US 7,979,620 B2
(45) Date of Patent: Jul. 12, 2011

(54) METHOD, SYSTEM AND COMPUTER PROGRAM FOR MONITORING ACTIVITIES ON COMPUTERS CONNECTED THROUGH A HARDWARE SWITCH

(75) Inventors: Fabio Benedetti, Rome (IT); Rosario Boccia, Salerno (IT); Pietro Marella, Rome (IT); Riccardo Rossi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 11/950,116

(22) Filed: Dec. 4, 2007

(65) Prior Publication Data
US 2008/0162744 A1 Jul. 3, 2008

(30) Foreign Application Priority Data
Dec. 27, 2006 (EP) .................................. 06127230

(51) Int. Cl.
- G06F 3/00 (2006.01)
- G06F 13/00 (2006.01)
- G06F 5/00 (2006.01)
- G06F 13/12 (2006.01)
- G06F 13/38 (2006.01)
- G06F 3/038 (2006.01)

(52) U.S. Cl. .............. 710/316; 710/1; 710/2; 710/8; 710/19; 710/20; 710/31; 710/36; 710/38; 710/62; 710/72; 345/204; 719/310

(58) Field of Classification Search .................. 370/537
See application file for complete search history.

(56) References Cited

U.S. PATENT DOCUMENTS

| | | | | |
|---|---|---|---|---|
| 4,124,889 A * | 11/1978 | Kaufman et al. | .................. | 710/2 |
| 4,124,895 A * | 11/1978 | Takise et al. | ..................... | 381/58 |
| 4,816,988 A * | 3/1989 | Yamanaka | ........................ | 700/83 |
| 4,849,880 A * | 7/1989 | Bhaskar et al. | ................ | 717/109 |
| 4,885,683 A * | 12/1989 | Coogan | ............................ | 714/36 |
| 5,289,574 A * | 2/1994 | Sawyer | .......................... | 715/759 |
| 5,461,560 A * | 10/1995 | Uribe | ............................. | 700/83 |
| 5,499,377 A * | 3/1996 | Lee | ................. | 709/244 |
| 6,088,430 A * | 7/2000 | McHale | ..................... | 379/93.28 |
| 6,343,320 B1 * | 1/2002 | Fairchild et al. | .............. | 709/224 |
| 6,473,811 B1 * | 10/2002 | Onsen | ............................ | 710/15 |
| 6,513,091 B1 * | 1/2003 | Blackmon et al. | ............ | 710/316 |
| 6,892,236 B1 * | 5/2005 | Conrad et al. | ................ | 709/224 |
| 6,957,287 B2 * | 10/2005 | Lou et al. | ......................... | 710/72 |
| 6,980,947 B2 * | 12/2005 | Cabezas et al. | ................ | 703/22 |
| 7,386,584 B2 * | 6/2008 | Chen | ............................ | 709/200 |
| 7,454,495 B2 * | 11/2008 | Chen et al. | ..................... | 709/224 |

(Continued)

*Primary Examiner* — Tariq Hafiz
*Assistant Examiner* — Henry Yu
(74) *Attorney, Agent, or Firm* — Yee & Associates, P.C.; Jeffrey S. LaBaw

(57) ABSTRACT

A technique for monitoring computers connected to a hardware switch. The switch is used to selectively connect a single set of peripheral units to the central unit of a selected one of the computers. In the proposed solution, status information of each non-selected computer is transmitted from the corresponding central unit to the switch. For this purpose, it is preferably exploited a corresponding bi-directional input port—such as of the USE type. The switch routes the status information of the different non-selected computers to the central unit of the selected computer. The central unit of the selected computer aggregates the status information with its output information, and then transmits this aggregated information to the switch for its display on a monitor. For example, the output information is shown in a main area of the screen, while the status information is shown in a reserved strip on top of it.

16 Claims, 4 Drawing Sheets

U.S. PATENT DOCUMENTS

| | | | |
|---|---|---|---|
| 7,518,741 B2 * | 4/2009 | Miyata | 358/1.1 |
| 2001/0019360 A1 * | 9/2001 | Tanaka et al. | 348/211 |
| 2003/0023737 A1 * | 1/2003 | Johnson et al. | 709/230 |
| 2004/0015980 A1 * | 1/2004 | Rowen et al. | 719/310 |
| 2005/0275641 A1 * | 12/2005 | Franz | 345/204 |
| 2005/0283563 A1 * | 12/2005 | Lou et al. | 710/316 |
| 2006/0026274 A1 * | 2/2006 | Cho et al. | 709/223 |
| 2006/0120410 A1 * | 6/2006 | Stafford-Fraser et al. | 370/537 |
| 2006/0143327 A1 * | 6/2006 | Hsieh et al. | 710/18 |
| 2006/0236347 A1 * | 10/2006 | Holovacs | 725/80 |
| 2007/0094426 A1 * | 4/2007 | Chiang et al. | 710/73 |
| 2007/0136498 A1 * | 6/2007 | Tseng et al. | 710/73 |

* cited by examiner

METHOD, SYSTEM AND COMPUTER PROGRAM FOR MONITORING ACTIVITIES ON COMPUTERS CONNECTED THROUGH A HARDWARE SWITCH

FIELD OF THE INVENTION

The present invention relates to the data processing field. More specifically, the present invention relates to the control of multiple computers.

BACKGROUND ART

In several workplaces, a single user may need to work with two or more computers. A typical example is that of an operator working on multiple consoles; another example is that of a tester working on applications running on different machines.

In this scenario, the computers are located in the same place (such as in a single room). However, the peripheral units used to control each computer (such as a keyboard, a mouse and a monitor) waste a relatively large area. This limits the number of computers that can be arranged on the same desktop (typically, one or at most two). Therefore, when the user must control a high number of computers, they must be spread across different desktops in order to accommodate the corresponding peripheral units. As a result, the user must move from a desktop to the other whenever they must switch between different computers.

In order to solve this problem, hardware switches are commonly used. A switch consists of a device that is used to selectively enable the use of a single set of peripheral units for different computers. For this purpose, the available peripheral units are plugged into the switch. A central unit of each computer is then connected to the switch (instead of to the required peripheral units). A knob is used to select the central unit of a computer at a time, which selected central unit is then coupled with the peripheral units.

In this way, the room required by the computers is greatly reduced since a single set of peripheral units is provided for all of them. As a result, these peripheral units and the switch can be arranged on the same desktop (with the central units of the different computers being placed close to it). Therefore, the user can move from a computer to the other by simply acting on the knob of the switch—without having to leave their desktop.

Nevertheless, the user is now unable to monitor any activities in progress on the other (non-selected) computers—for example, to verify whether a specific task has been completed. For this purpose, the user must continually switch the peripheral units to the desired non-selected computer (in order to verify its condition). This is annoying for the user, and it distracts them from the current job on the selected computer.

A solution to this problem would be that of exploiting well-known collaborative techniques, wherein (target) computers are controlled remotely from a single (controller) computer. In this case, any image displayed on the target computers is replicated exactly on the controller computer, so as to allow monitoring of their activities.

However, this requires a network connectivity between the different computers. Therefore, a specific network infrastructure must be implemented for this purpose. Particularly, each computer must be configured individually to be accessible in the network. All of the above involves extra cost and a significant waste of time.

In any case, these solutions may be untenable in some specific situations. For example, the connection of the computers in a network may be not possible because of security constraints. Moreover, even when the network connectivity is available, firewall rules may prevent the desired communications.

SUMMARY OF THE INVENTION

In its general terms, the present invention is based on the idea of expanding the functionality of the switch.

Particularly, the present invention provides a solution as set out in the independent claims. Advantageous embodiments of the invention are described in the dependent claims.

More specifically, an aspect of the invention provides a method for controlling multiple computers. The computers are arranged in a configuration, which includes a central processing unit for each computer, a set of peripheral units for all the computers, and a switching device. The switching device is used to selectively connect the peripheral units with the central unit of a selected one of the computers. Input information is transmitted from at least part of the peripheral units to the central unit of the selected computer through the switching device. Likewise, output information is transmitted from the central unit of the selected computer to at least part of the peripheral units through the switching device. In addition, status information of each non-selected computer is transmitted from the central unit of the non-selected computer to the switching device. The status information is routed to one or more of the peripheral units, so as to have the status information output on this peripheral unit.

In a preferred embodiment of the invention, the central unit of each non-selected computer transmits the status information to the switching device through an input port thereof of the bi-directional type, which is normally used for receiving input information from a corresponding input unit.

Typically, the switching device forwards the status information to the central unit of the selected computer, which then aggregates it with its output information.

Preferably, for this purpose the status information of the non-selected computers is multiplexed with the input information of the selected computer.

For example, the status information is displayed in a reserved area of a monitor, which is distinct from a main area thereof for the output information of the selected computer.

In a proposed implementation, the status information consists of predefined attributes of selected tasks running on each non-selected computer.

In another embodiment, the status information consists of an indication of the progress of selected applications running on each non-selected computer.

In a further embodiment of the invention, the status information is obtained by intercepting the output information of each non-selected computer.

Another aspect of the invention proposes a computer program for performing the above-described method.

A different aspect of the invention proposes a corresponding system.

A further aspect of the invention proposes a switching device.

A still further aspect of the invention proposes a data processing configuration including this switching device.

REFERENCE TO THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION OF THE PREFERRED EMBODIMENT

Figure 1:
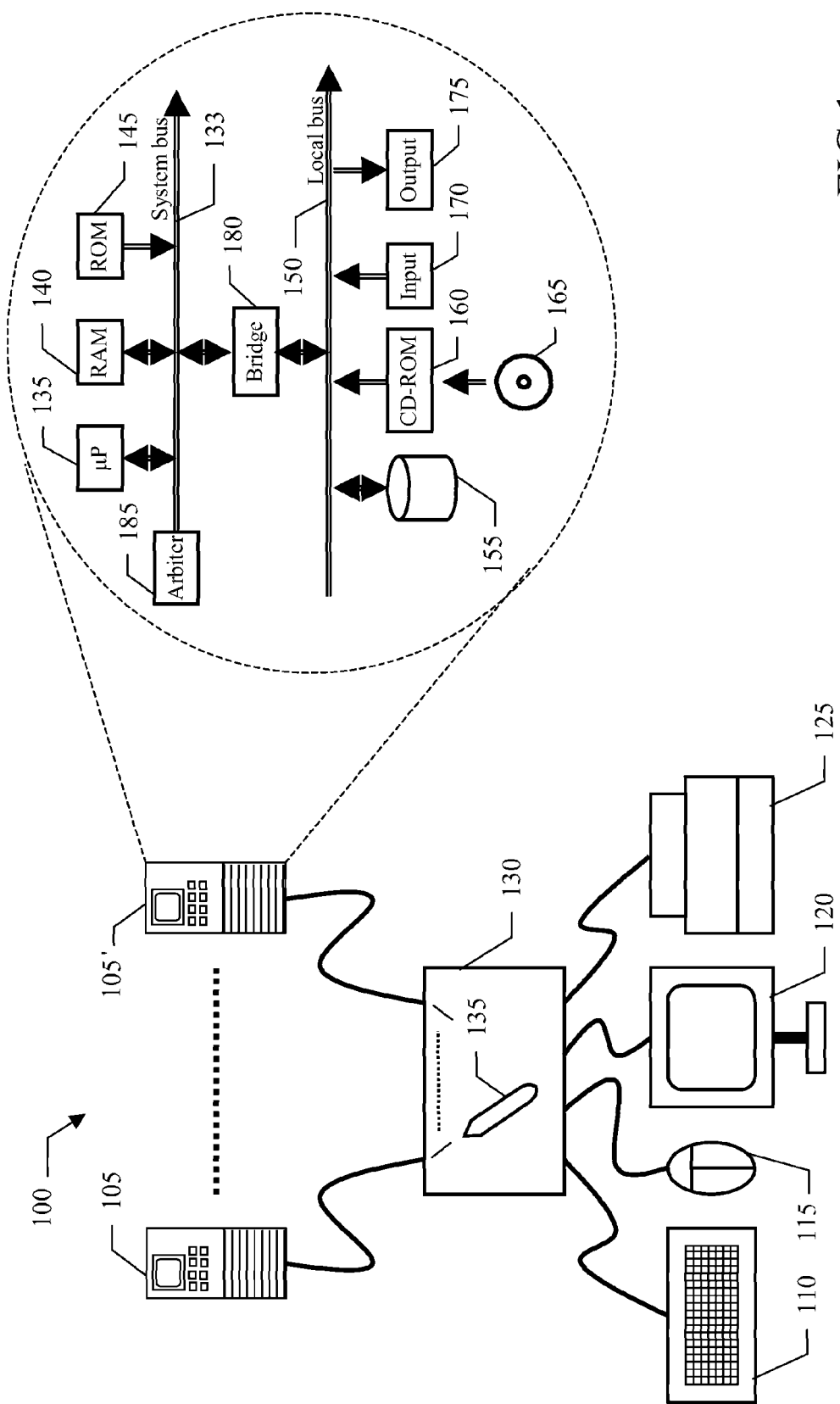
FIG. 1 is a schematic block diagram of a data processing configuration in which the solution according to an embodiment of the invention is applicable.

With reference in particular to FIG. 1, a data processing configuration 100 based on a plurality of computers is illustrated. Each computer is formed by a central processing unit 105, which houses all the electronic circuits controlling its operation. The configuration 100 also includes a set of peripheral units, which allow a user to interact with all the computers (as it will be apparent in the following). Particularly, input (peripheral) units are used to enter information by the user. For example, the configuration 100 includes a keyboard 110 (for typing characters, numbers and special symbols) and a mouse 115 (for manipulating a current working position defined by a cursor). On the other hand, output (peripheral) units are used to provide information to the user. For example, the configuration 100 includes a monitor 120 for displaying text and graphical images and a printer 125 for providing a hard-copy of the same information.

The central (processing) units 105, 105' and the peripheral units 110-125 are all connected to a hardware switch 130. The switch 130 is provided with a knob 135, which may be moved to different positions associated with the central units 105 that may be connected to the switch 130. The knob 135 is used to select one of the central units 105 by moving it to the corresponding position (hereinafter, the selected central unit and its components will be differentiated with a prime notation). As a result, the switch 130 connects the peripheral units 110-125 to the selected central unit 105' directly so as to be completely opaque to its operation. The other (non-selected) central units 105 are instead insulated from the peripheral units 110-125.

The central unit 105,105' of a generic computer is formed by several units that are connected in parallel to a system bus 133. In detail, one or more microprocessors (vP) 135 control operation of the computer, a RAM 140 is directly used as a working memory by the microprocessor(s) 135, and a ROM 145 stores basic code for a bootstrap of the computer. Several peripheral units are clustered around a local bus 150. Particularly, a mass memory consists of a hard-disk 155 and a drive 160 for reading CD-ROMs 165. Moreover, one or more controllers 170 are used to manage the flow of information with the input units, and one or more controllers 175 are used to manage the flow of information with the output units (external to the central unit 105,105'). A bridge unit 180 interfaces the system bus 133 with the local bus 150. Each microprocessor 135 and the bridge unit 180 can operate as master agents requesting an access to the system bus 133 for transmitting information. An arbiter 185 manages the granting of the access with mutual exclusion to the system bus 133.

Figure 2:
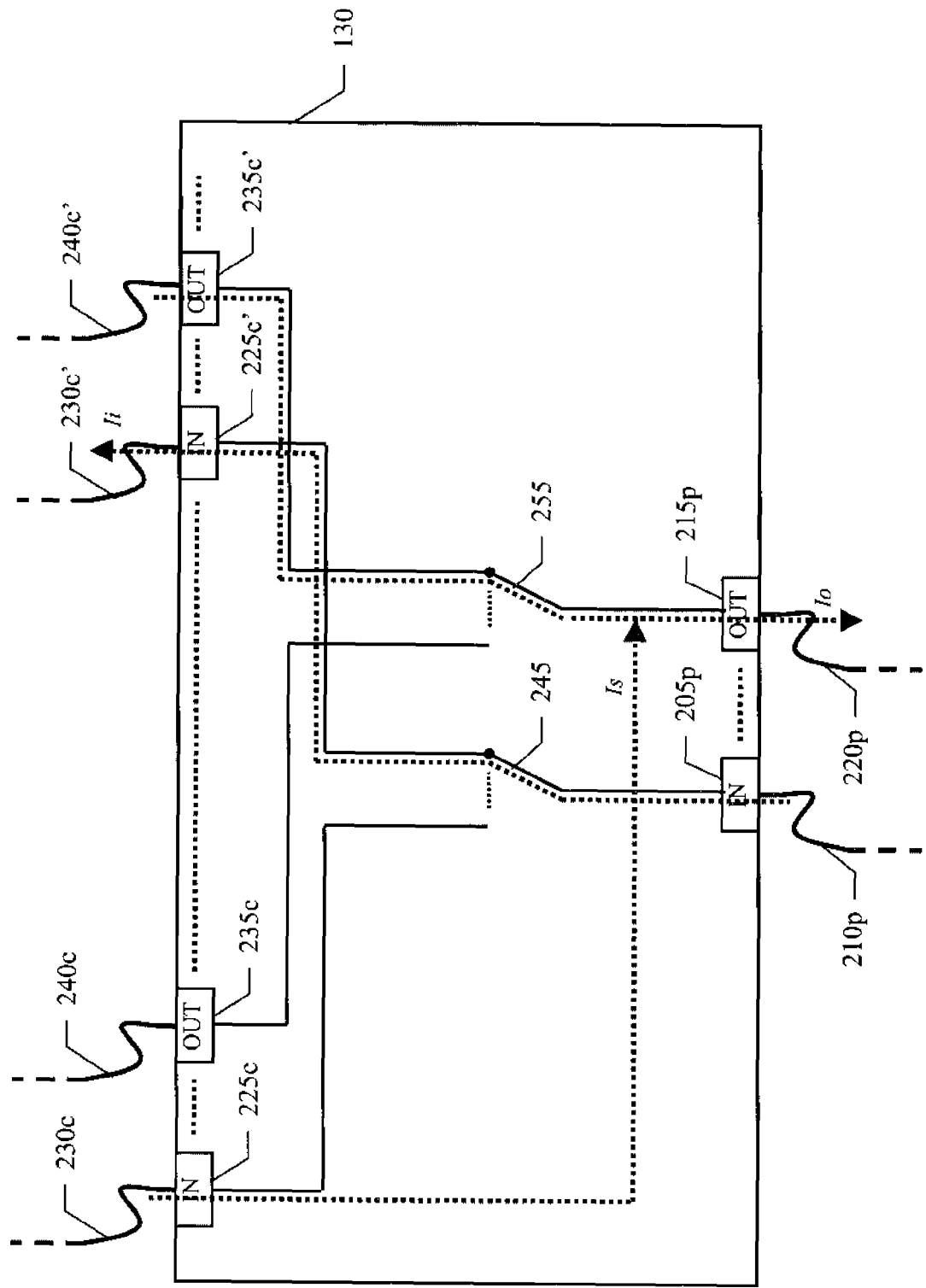
FIG. 2 is a functional representation of a hardware switch of this configuration.

Considering now FIG. 2, the switch 130 includes a peripheral port for each peripheral unit that may be connected thereto (for example, 4-8). The peripheral port consists of a connector exactly the same as the one that must be available on the central units for plugging the desired peripheral unit (for example, a USB receptacle of the type-B). Particularly, one or more (peripheral) input ports 205p are provided for the input units (i.e., the keyboard and the mouse). Each input port 205p is connected to the corresponding input unit (not shown in the figure) by means of a cable 210p. For this purpose, the cable 210p ends with two connectors mating the input port 205p and a corresponding port available on the input unit. Likewise, one or more (peripheral) output ports 215p are provided for the output units (i.e., the monitor and the printer). Each output port 215p is connected to the corresponding output unit by means of a cable 220p. As described above, the cable 220p ends with two connectors mating the output port 210p and a corresponding port available on the output unit.

The switch 130 also includes a set of processing ports for each central unit that may be connected thereto (for example, 2-4). Each processing port consists of a plug exactly the same as the one that is available on a corresponding type of peripheral units for connecting them to the central units (for example, a USB receptacle of the type-A). Particularly, each set of processing ports includes one or more (processing) input ports 225c for the input units. Each input port 225c is connected to the corresponding central unit (not shown in the figure) by means of a cable 230c. For this purpose, the cable 230c ends with two connectors mating the input port 225c and a corresponding port available on the central unit for connecting the desired input unit. Likewise, one or more (processing) output ports 235c are provided for the output units. Each output port 235c is connected to the corresponding central unit by means of a cable 240c (ending with two connectors mating the output port 235c and a corresponding port available on the central unit for connecting the desired output unit).

A multi-path switch (for example, of the electronic type) is provided for each peripheral port 205p,215p. A generic switch 245,255 has a peripheral terminal connected to the Corresponding peripheral port 205p,215p. The switch 245, 255 also has a plurality of processing terminals, each one for a corresponding set of processing ports 225c,235c. Each processing terminal of the switch 245,255 is connected to the processing port 225c,235c of the corresponding set, where processing port 225c,235c is associated with the peripheral port 205p,215p connected to the peripheral terminal of the same switch 245,255. In the example at issue, the peripheral terminal of the switch 245 is connected to the input port 205p (for the input unit) and its processing terminals are connected to the input ports 225c (for the central units). Likewise, the peripheral terminal of the switch 255 is connected to the output port 215p (for the output unit) and its processing terminals are connected to the output ports 235c (for the central units). Each switch 245,255 includes a contact that is used to connect the peripheral terminal with a selected one of the processing terminals so as to close a corresponding circuit, while the circuits between the peripheral terminal and the other non-selected processing terminals are broken. The switches 245,255 are all controlled in the same way (according to the choice of the user acting on the knob—not shown in the figure). More specifically, the peripheral terminals of the switches 245,255 are always connected to their processing terminals coupled with the set of processing ports 225c',235c' for the selected central unit. In this way, all the available peripheral units will be connected to the selected central unit through the cables 210p,220p, the peripheral ports 205p, 215p, the switches 245,255, the processing ports 225c',235c' and the cables 230c',240c'.

In operation, any input information Ii (such as data and/or commands) entered by the user with the available input units (i.e., the keyboard and the mouse) is transmitted to the selected central unit for its processing—through the path 210p,205p,245,225c',230c' represented with an arrow in dotted line in the figure. Likewise, any output information Io provided by the selected central unit is transmitted to the desired output units (i.e., the monitor or the printer) for its provision to the user—through the path 240c',235c',255, 215p,220p represented with another arrow in dotted line in the figure.

At the same time, the input port 225c of each non-selected central unit does not receive any input information—since it is floating in the switch 130. Moreover, any output information provided by each non-selected central unit to the output port 235c (through the cable 240c) is lost—since it is again floating in the switch 130.

In the solution according to an embodiment of the present invention, as described in detail in the following description, status information Is of each non-selected computer is transmitted from the corresponding central unit to the switch 130. The switch 130 routes the status information to one or more of the output units connected to the output port(s) 215p, such as to the monitor through the selected central unit—as represented with a further arrow in dotted line in the figure.

This allows monitoring any activities in progress on the non-selected computers without having to switch the peripheral units to the non-selected computers in order to verify their condition. Therefore, the user is not distracted from the current job on the selected computer.

The desired result is achieved without requiring any network connectivity between the different computers. Therefore, the proposed technique is very simple and cost effective.

Moreover, the solution described above is of general applicability. Particularly, it allows monitoring the computers even when their direct connection in a network is not possible (for example, because of security constraints), or when (despite the network connectivity) firewall rules prevent the desired communications.

In a preferred embodiment of the invention, as shown in the figure, the central unit of each non-selected computer transmits the status information Is to the switch 130 through the input port(s) 225c. Naturally, this requires that the input port(s) 225c should be bi-directional (for example, of the USB type). Therefore, the proposed implementation exploits a communication channel that is completely idle. It should be noted that the input port 225c is used for this purpose exactly to the contrary of its natural function, i.e., for receiving information from the central unit instead of transmitting information thereto.

Figure 3:
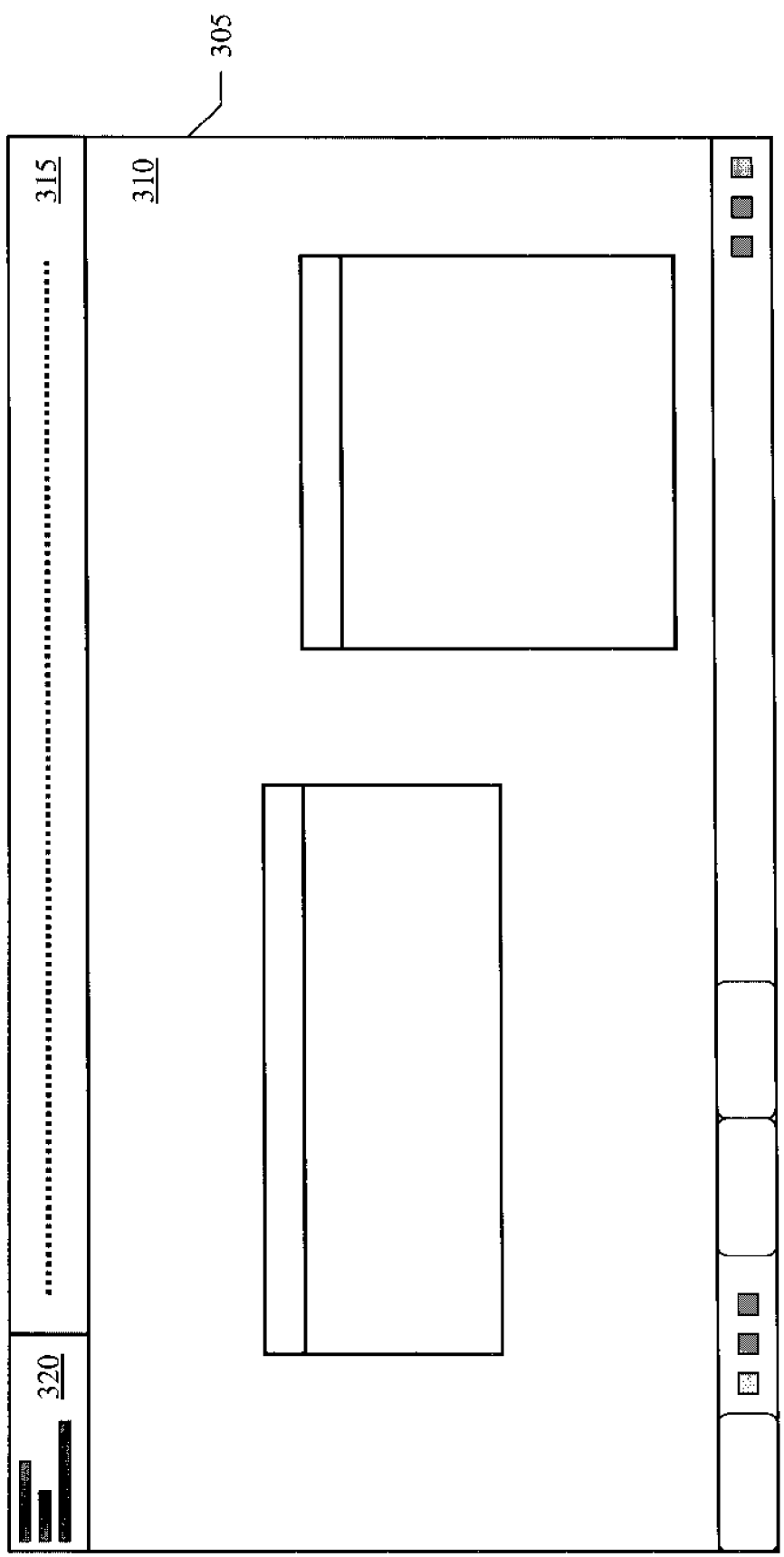
FIG. 3 illustrates an exemplary application of the solution according to an embodiment of the invention.

Moving now to FIG. 3, the monitor has a screen 305 that is used to display the desired output information. For this purpose, a main area 310 of the screen 305 is reserved to the selected computer. Typically, the selected computer is provided with a Graphical User Interface (GUI). In this case, the main area 310 is configured like a desktop with different graphical objects, which allow the user to interact with the selected computer—such as windows, icons, task bars, and the like.

In the solution according to an embodiment of the present invention, a reserved area 315 of the screen 305 is instead used to display the status information of the non-selected computers. For example, the reserved area 315 consists of a small strip on top of the main area 310. Typically, the reserved area 315 includes a distinct frame 320 for each non-selected computer.

In this way, it is possible to monitor the non-selected computers with the minimal impact on the operation of the selected computer. At the same time, the user is not distracted during their job.

Figure 4:
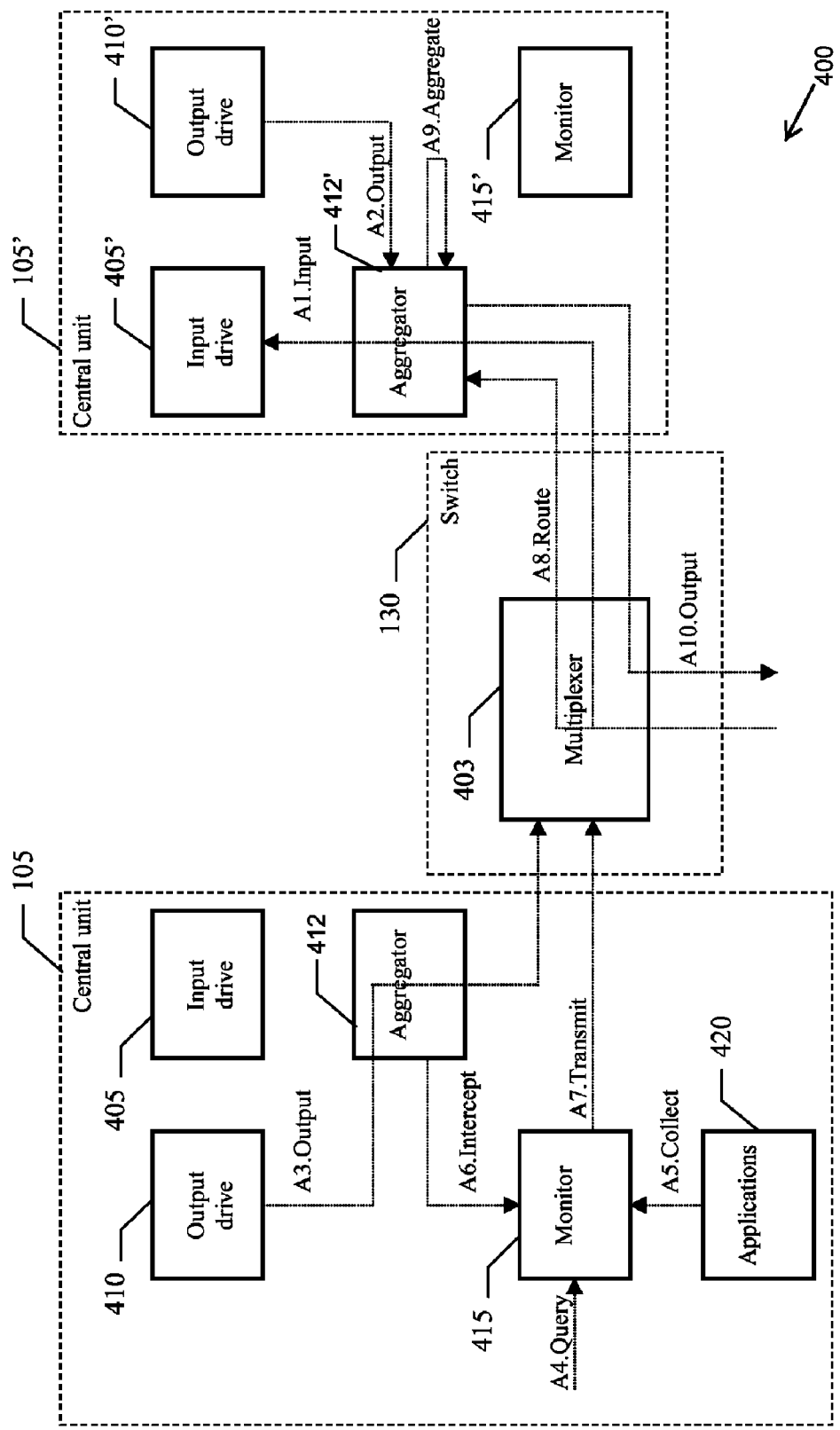
FIG. 4 is a collaboration diagram representing the roles of different components that may be used to implement the solution according to an embodiment of the invention.

With reference now to FIG. 4, the main software and/or hardware components that can be used to implement the solution according to an embodiment of the invention are denoted as a whole with the reference 400. The information (programs and data) is typically stored on the hard-disk and loaded (at least partially) into the working memory of each computer when the programs are executed. The programs are initially installed onto the hard-disk, for example, from CD-ROMs. Particularly, the figure describes the static structure of the system (by means of the corresponding components) and its dynamic behavior (by means of a series of exchanged messages, each one representing a corresponding action, denoted with sequence numbers preceded by the symbol "A").

In detail, the switch 130 includes a multiplexer 403 for managing the routing of the relevant information, as will be apparent in the following description.

Moving now to the different central units 105,105', one or more input drives 405,405' are used to manage corresponding input units. Likewise, one or more output drives 410,410' are used to manage corresponding output units.

In the solution according to an embodiment of the present invention, each central unit 105,105' is also provided with an aggregator 412,412'. The aggregator 412,412' is used to filter the communications with the switch 130 so as to implement the proposed monitoring functionality. Particularly, each input unit transmits input information to the switch 130, whose multiplexer 403 forwards this input information to the relevant input drive 405 of the selected computer—through the aggregator 412'. Each input drive 405 of the non-selected computers is instead inactive. On the other hand, each output drive 410' of the selected computer provides output information for its output unit (action "A2.Output"). This output information is transmitted to the switch 130 by the aggregator 412' (as described in the following description). Each output drive 410 of the non-selected computers is directly transmitted to the switch 130 through the aggregator 412, where it is lost (action "A3. Output").

In the solution according to an embodiment of the present invention, a monitor 415,415' is added to each central unit 105,105'. The monitor 415 of each non-selected computer collects corresponding status information for its transmission to the switch 130. Conversely, the monitor 415' of the selected computer is disabled (for example, in response to a command signal provided by the multiplexer 403 of the switch 130 whenever the user selects another computer).

The status information may be collected on each non-selected computer in different ways.

For example, in a suggested implementation the monitor 415 retrieves a list of tasks running on the non-selected computer. Preferably, the tasks are selected according to predefined criteria (for example, to discard system tasks). Each task is characterized by one or more attributes such as its name, processing usage, memory usage, and the like. Typically, this information is obtained by querying an operating system of the non-selected computer—not shown in the figure (action "A4.Query"). In this way, the status information provides a sort of virtual monitor of the non-selected computer.

In a different implementation, the monitor 415 collects an indication of the progress of one or more selected applications 420 running on the non-selected computer (action "A5.Collect"). This makes it possible to trace the actual condition of the applications 420 of interest, for example, by means of corresponding progress bars.

Alternatively, the monitor 415 may intercept the output information provided by the output drive 410 (action "A6.Intercept"). In the latter case, the status information may replicate the desktop of the non-selected computer, for example, by means of its miniaturized representation.

In any case, the monitor 415 transmits the status information so obtained to the switch 130—through the aggregator 412 (action "A7.Transmit"). The multiplexer 403 routes the status information to the central unit 105' of the selected computer (action "A8.Multiplex"). In a preferred embodiment of the invention, this result is achieved by multiplexing the status information (from the central unit 105 of the non-selected computers) with the input information (from the input units). For example, this is possible by exploiting the intrinsic capability of a port of the USB type (which allows multiplexing packets—in both directions—for different units connected to the same port). The aggregator 412' of the selected computer intercepts the status information from the switch 130 before it reaches the input drive 405' (while the input information passes through it). Likewise, as pointed out above, the aggregator 412' intercepts the output information from the output drive 410'. The aggregator 412' combines the status information with the output information (action "A9.Aggregate"). The aggregated information so obtained is then transmitted to the switch 130, whose multiplexer 403 routes it to the monitor for its display (action "A10.Output"). Conversely, the aggregator 412 of each non-selected computer is disabled, for example, in response to the same command signal mentioned-above.

Naturally, in order to satisfy local and specific requirements, a person skilled in the art may apply to the solution described above many modifications and alterations. More specifically, although the present invention has been described with a certain degree of particularity with reference to preferred embodiment(s) thereof, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof. Conversely, well-known features may have been omitted or simplified in order to not obscure the description with unnecessary particulars. Moreover, it is expressly intended that specific elements and/or method steps described in connection with any disclosed embodiment of the invention may be incorporated in any other embodiment as a matter of general design choice.

Particularly, the proposed solution lends itself to be implemented with an equivalent method (by using similar steps, removing some non-essential steps, or adding further optional steps—even in a different order).

Similar considerations apply if the switch is used to connect other peripheral units to the selected computer (for example, a loudspeaker, a microphone, and the like). Moreover, some peripheral units may combine both input and output functionality, for example, in the case of a touchscreen.

Likewise, any other kind of information may be input and/or output (such as sounds, videos, and the like).

Moreover, it is also possible to use more output units for providing the status information (for example, by adding an acoustic signal for specific events of particular relevance occurred on the non-selected computers).

The use of other communication channels for providing the status information to the switch is within the scope of the invention (for example, through output ports or ports for input/output units).

The output information of the selected computer and the status information of the non-selected computers may be aggregated in any other way. For example, the aggregator may manage the GUI displaying the output information and the status information directly, or it may simply transmit this information in time-multiplexing. However, nothing prevents aggregating the status information with the output information somewhere else (for example, directly in the switch).

Naturally, the transmission of the status information to the switch may be carried out by any other bi-directional port (non-necessarily of the USB type), or with equivalent techniques.

Alternatively, the reserved area for the frames used to display the status information of the non-selected computers may be arranged in a different position, for example, at the side of the desktop. Moreover, it is possible to display the status information in transparency on the desktop, miniaturized in the task bar, or in any other way.

Without departing from the principles of the invention, the status information may be collected and/or displayed in different ways.

For example, the tasks to be monitored may be selected according to whatever criteria. In any event, nothing prevents applying the same solution to all the tasks running on each non-selected computer. Moreover, other attributes of the tasks may be provided (such as their I/O activity), or the desired information may be obtained in a different way (for example, by means of a dedicated agent).

Likewise, it is possible to show the progress of the desired applications running of the non-selected computers with any other representation, such as by means of a numerical index.

At the end, the frame of each non-selected computer may display only the most relevant information of its desktop (such as relating to the open windows only).

Anyway, the described examples are merely illustrative and they must not be interpreted in a limitative manner. More generally, it is possible to use any other status information for implementing the proposed solution (such as relating to the completion of selected programs, to the obtaining of expected results, and the like).

Similar considerations apply if the program (which may be used to implement each embodiment of the invention) is structured in a different way, or if additional modules or functions are provided. Likewise, the memory structures may be of other types, or may be replaced with equivalent entities not necessarily consisting of physical storage media. In any case, the program may take any form suitable to be used by or in connection with any data processing system, such as external or resident software, firmware, or microcode (either in object code or in source code—for example, to be compiled or interpreted). Moreover, it is possible to provide the program on any computer-usable medium. The medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to the present invention lends itself to be implemented with a hardware structure (for example, integrated in a chip of semiconductor material), or with a combination of software and hardware.

Alternatively, the proposed method may be carried out with a different number of computers. Each computer may have another architecture or it may include equivalent units (such as cache memories temporarily storing the programs or parts thereof to reduce the accesses to the mass memory during execution). More generally, it is possible to replace the computer with any code execution entity (such as a microcontroller).

Likewise, it is possible to replace the switch with any equivalent device (having a different structure or implemented with other components). Moreover, the switch may be provided with any number of ports. The ports may also be of any other type—for example, of the RJ45 type, of the RS232 type, and the like. In any case, it is emphasized that the distinction between input ports and output ports is sometimes merely logic. In other words, in most practical situations the same (bi-directional) ports may be used to connect either input units or output units.

The invention claimed is:

1. A method for controlling multiple computers in a configuration including a central processing unit for each computer, a set of peripheral units for all the computers, and a multiplexing device for selectively physically connecting the peripheral units with the central unit of a selected one of the computers and selectively physically disconnecting the peripheral units with the central unit of non-selected computers of the computers, wherein the method includes the steps of:
   transmitting input information from at least one of the peripheral units to the central unit of the selected computer through the multiplexing device,
   transmitting output information from the central unit of the selected computer to at least one of the peripheral units through the multiplexing device,
   transmitting status information of each non-selected computer of the non-selected computers from the central unit of each non-selected computer to a port of the multiplexing device that is also used for transmitting selected computer input information from the at least one of the peripheral units to the central unit of non-selected computer when the non-selected computer is instead operating as the selected computer, wherein the multiplexing device disconnects the each non-selected computer from the peripheral units when non-selected except for the status information, and
   routing the status information by the multiplexing device to at least one of the peripheral units to have the at least one peripheral unit output the status information.

2. A method for controlling multiple computers in a configuration including a central processing unit for each computer, a set of peripheral units for all the computers, and a multiplexing device for selectively physically connecting the peripheral units with the central unit of a selected one of the computers and selectively physically disconnecting the peripheral units with the central unit of non-selected computers of the computers, wherein the method includes the steps of:
   transmitting input information from at least one of the peripheral units to the central unit of the selected computer through the multiplexing device,
   transmitting output information from the central unit of the selected computer to at least one of the peripheral units through the multiplexing device,
   transmitting status information of each non-selected computer of the non-selected computers from the central unit of each non-selected computer to the multiplexing device, wherein the multiplexing device disconnects the each non-selected computer from the peripheral units, and routing the status information by the multiplexing device to at least one of the peripheral units to have the at least one peripheral unit output the status information, wherein the multiplexing device has a set of input peripheral ports each one for connecting a corresponding input one of the peripheral units, a set of output peripheral ports each one for connecting a corresponding output one of the peripheral units, a plurality of sets of processing ports each one for connecting the central unit of a corresponding computer, the processing ports including a subset of input ones of the processing ports each one for a corresponding input peripheral port for receiving input information from an input peripheral device and a subset of output ones of the processing ports each one for a corresponding output peripheral port for sending output information to an output peripheral device, wherein the step of transmitting the status information includes:
   transmitting the status information of each non-selected computer from the central unit of the non-selected computer to at least one of the corresponding input processing ports of the multiplexing device, the at least one input processing port being bi-directional.

3. The method according to claim 1, wherein the step of routing the status information includes:
   forwarding the status information from the multiplexing device to the central unit of the selected computer,
   the selected computer aggregating the status information with the output information into aggregated information, and
   transmitting the aggregated information from the central unit of the selected computer to the at least one peripheral unit through the multiplexing device to cause the at least one peripheral unit to output the aggregated information.

4. The method according to claim 3, wherein the step of forwarding the status information includes:
   multiplexing the status information with the input information.

5. The method according to claim 3, wherein the at least one peripheral unit includes a monitor, the step of transmitting the aggregated information including:
   transmitting the aggregated information from the central unit of the selected computer to the monitor to cause the monitor to display the output information in a main area of the monitor and the status information in a remaining area of the monitor.

6. The method according to claim 1, wherein the step of transmitting the status information includes:
   providing the status information on each non-selected computer by collecting predefined attributes of selected tasks running on the non-selected computer by a monitor of each non-selected computer, wherein the monitor is selectively disabled when a given non-selected computer is switched to be the selected computer by the multiplexing device.

7. The method according to claim 1, wherein the step of transmitting the status information includes:
   providing the status information on each non-selected computer by collecting an indication of the progress of selected applications running on the non-selected computer.

8. The method according to claim 1, wherein the step of transmitting the status information includes:
   providing the status information on each non-selected computer by intercepting further output information for the peripheral units being transmitted by the non-selected computer to the multiplexing device.

9. A system for controlling multiple computers in a configuration including a central processing unit for each computer, a set of peripheral units for all the computers, and a multiplexing device for selectively physically connecting the peripheral units with the central unit of a selected one of the computers and selectively physically disconnecting the peripheral units with the central unit of non-selected computers of the computers, wherein the system includes:

a data processor coupled to a memory and operable for executing instructions in the memory to perform steps of:

transmitting input information from at least one of the peripheral units to the central unit of the selected computer through the multiplexing device, transmitting output information from the central unit of the selected computer to at least one of the peripheral units through the multiplexing device, transmitting status information of each non-selected computer of the non-selected computers from the central unit of each non-selected computer to a port of the multiplexing device that is also used for transmitting selected computer input information from the at least one of the peripheral units to the central unit of non-selected computer when the non-selected computer is instead operating as the selected computer, wherein the multiplexing device disconnects the each non-selected computer from the peripheral units when non-selected except for the status information, and routing the status information by the multiplexing device to at least one of the peripheral units to have the at least one peripheral unit output the status information.

10. The system according to claim 9, wherein the multiplexing device has a set of input peripheral ports each one for connecting a corresponding input one of the peripheral units, a set of output peripheral ports each one for connecting a corresponding output one of the peripheral units, a plurality of sets of processing ports each one for connecting the central unit of a corresponding computer, the processing ports including a subset of input ones of the processing ports each one for a corresponding input peripheral port for receiving input information from an input peripheral device and a subset of output ones of the processing ports each one for a corresponding output peripheral port for sending output information to an output peripheral device, wherein the transmitting the status information includes:

transmitting the status information of each non-selected computer from the central unit of the non-selected computer to at least one of the corresponding input processing ports of the multiplexing device, the at least one input processing port being bi-directional.

11. The system according to claim 9, wherein the routing the status information includes:

forwarding the status information from the multiplexing device to the central unit of the selected computer, aggregating, by the selected computer, the status information with the output information into aggregated information, and transmitting the aggregated information from the central unit of the selected computer to the at least one peripheral unit through the multiplexing device to cause the at least one peripheral unit to output the aggregated information.

12. The system according to claim 11, wherein the forwarding the status information includes:

multiplexing the status information with the input information.

13. The system according to claim 11, wherein the at least one peripheral unit includes a monitor, and the transmitting the aggregated information includes:

transmitting the aggregated information from the central unit of the selected computer to the monitor to cause the monitor to display the output information in a main area of the monitor and the status information in a remaining area of the monitor.

14. The system according to claim 9, wherein the transmitting the status information includes:

providing the status information on each non-selected computer by collecting predefined attributes of selected tasks running on the non-selected computer.

15. The system according to claim 9, wherein the transmitting the status information includes:

providing the status information on each non-selected computer by collecting an indication of the progress of selected applications running on the non-selected computer.

16. A computer program product including a computer-usable storage medium embodying a computer program for use in a data processing configuration including a central processing unit for each one of multiple computers, a set of peripheral units for all the computers, and a multiplexing device for selectively connecting the peripheral units with the central unit of a selected one of the computers and selectively disconnecting the peripheral units with the central unit of non-selected computers of the computers, the computer program when executed on the configuration causing the configuration to perform a method for controlling the multiple computers in accordance with the steps of claim 1.

* * * * *